United States Patent
Seibt

(10) Patent No.: US 10,287,016 B2
(45) Date of Patent: *May 14, 2019

(54) LAVATORY UNIT

(71) Applicant: Airbus Operations GmbH, Hamburg (DE)

(72) Inventor: Christian Seibt, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,404

(22) Filed: Sep. 25, 2018

(65) Prior Publication Data

US 2019/0023399 A1 Jan. 24, 2019

Related U.S. Application Data

(63) Continuation of application No. 14/864,095, filed on Sep. 24, 2015, now Pat. No. 10,106,259, which is a
(Continued)

(30) Foreign Application Priority Data

Mar. 26, 2013 (EP) .................................... 13161103

(51) Int. Cl.
  *B64D 11/02* (2006.01)
  *A47K 17/02* (2006.01)

(52) U.S. Cl.
  CPC .............. *B64D 11/02* (2013.01); *A47K 17/02* (2013.01); *Y02T 50/46* (2013.01)

(58) Field of Classification Search
  CPC ...................................................... B64D 11/02
(Continued)

(56) References Cited

U.S. PATENT DOCUMENTS

| 5,185,759 A | 2/1993 | Matsuyama |
| 5,477,574 A | 12/1995 | Skoe |

(Continued)

FOREIGN PATENT DOCUMENTS

| CN | 102762455 A | 10/2012 |
| DE | 102 04 343 A1 | 8/2003 |

(Continued)

OTHER PUBLICATIONS

International Search Report and Written Opinion dated Jun. 6, 2014.
(Continued)

*Primary Examiner* — Christopher P Ellis
(74) *Attorney, Agent, or Firm* — Lerner, David, Littenberg, Krumholz & Mentlik, LLP

(57) ABSTRACT

Lavatories on-board a vehicle, and in particular to a lavatory unit for use by persons with reduced mobility on-board a vehicle are described. The lavatory unit includes a lavatory housing structure enclosing a lavatory interior space, a door opening in the lavatory housing structure, a toilet assembly inside the lavatory interior space, and a transition seating support for a user. The transition seating support provides a first transfer position and a second transfer position. In the first transfer position, in an open door state the transition seating support is directly accessible for a person sitting in a wheelchair that is located at least partly outside the lavatory unit such that the person can transfer to the transition seating support and vice versa, and in the second transfer position, a person sitting on the transition seating support can transfer to the toilet assembly and vice versa.

19 Claims, 13 Drawing Sheets

Related U.S. Application Data continuation of application No. PCT/EP2014/056077, filed on Mar. 26, 2014.

(58) Field of Classification Search
USPC ........................................ 244/118.5
See application file for complete search history.

(56) References Cited

U.S. PATENT DOCUMENTS

| | | | |
|---|---|---|---|
| 5,926,859 A | 7/1999 | Kimura | |
| 6,615,421 B2* | 9/2003 | Itakura | B64D 11/02 244/118.5 |
| 7,152,257 B2 | 12/2006 | Lasch et al. | |
| 7,364,119 B2* | 4/2008 | Sprenger | B64D 11/00 244/118.6 |
| 7,866,603 B2 | 1/2011 | Cooper et al. | |
| 8,672,267 B2 | 3/2014 | Schliwa et al. | |
| 8,944,377 B2* | 2/2015 | McIntosh | E03D 11/00 244/118.5 |
| 9,688,407 B2* | 6/2017 | McIntosh | B64D 11/02 |
| 2005/0116099 A1 | 6/2005 | Pho et al. | |
| 2012/0119029 A1* | 5/2012 | Tappe | B64D 11/02 244/118.5 |
| 2012/0261509 A1* | 10/2012 | Grant | B64D 11/02 244/118.5 |
| 2015/0048205 A1* | 2/2015 | Seibt | B64D 11/02 244/118.5 |
| 2015/0259070 A1* | 9/2015 | Seibt | B64D 11/02 244/118.5 |
| 2017/0137131 A1* | 5/2017 | Seibt | B64D 11/00 |

FOREIGN PATENT DOCUMENTS

| | | |
|---|---|---|
| EP | 1209078 A2 | 5/2002 |
| EP | 1510456 A1 | 3/2005 |
| GB | 2322296 A | 8/1998 |
| GB | 2 410 431 A | 8/2005 |
| GB | 2467166 A | 7/2010 |
| JP | 5163758 B2 | 3/2013 |
| WO | 2011/101305 A1 | 8/2011 |
| WO | 2011/101385 A2 | 8/2011 |

OTHER PUBLICATIONS

Extended European Search Report dated Aug. 12, 2013.
Chinese Office Action dated Apr. 21, 2016.

* cited by examiner

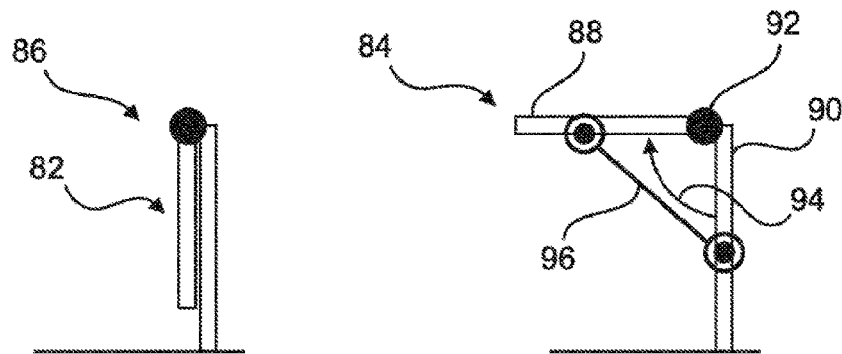
Fig.12
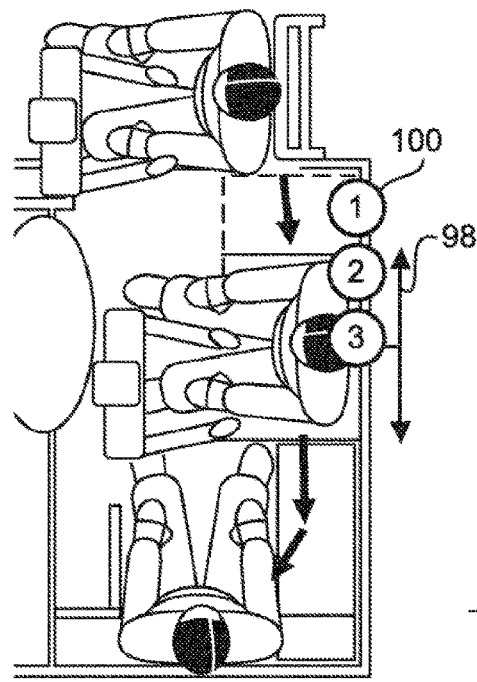 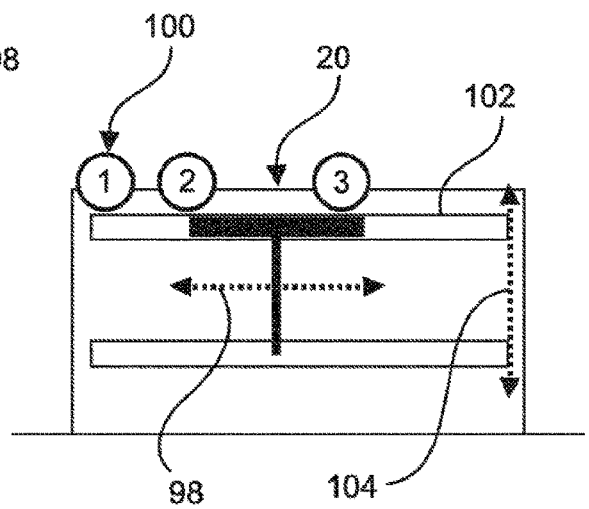
Fig.13a　　　　　Fig.13b

LAVATORY UNIT

CROSS-REFERENCE TO RELATED APPLICATIONS

The present application is a continuation of U.S. patent application Ser. No. 14/864,095, filed on Sep. 24, 2015, which is a continuation of International Application No. PCT/EP2014/056077, filed Mar. 26, 2014, published in English, which claims priority from European Patent Application no. EP 13161103.0 filed Mar. 26, 2013, all of which are incorporated herein by reference.

FIELD OF THE INVENTION

The present invention relates to lavatories on-board a vehicle, and relates in particular to a lavatory unit for use by persons with reduced mobility on-board a vehicle, an aircraft, a use of a lavatory unit, and a method for providing a handicapped-accessible lavatory unit on-board a vehicle.

BACKGROUND OF THE INVENTION

Vehicles for longer travel durations are regularly equipped with lavatory units. For example, aircrafts are provided with lavatory units to provide respective service to passengers. Further examples for lavatory units on-board a vehicle, i.e. vehicles equipped with lavatory units are trains and also coaches. Of course, also ships may be equipped with lavatory units. In particular aircrafts, such as airplanes or helicopters, as well as trains and coaches have space-saving requirements for cabin layout and for all service units to be integrated in the vehicle, because, among other reasons, the space used for service units, such as lavatory units, can no longer be used for providing passenger seats. Thus, lavatory units for use on-board a vehicle should be as small as possible. However, small lavatory units with minimized space relations may not allow to be used by persons with reduced mobility, for example by persons sitting in a wheelchair. Therefore, at least a selection of lavatory units on-board a vehicle must also consider the specific requirements resulting from the use by persons sitting in wheelchairs. For example, WO 2011/101385 A2 describes a toilet assembly for a means of transportation, for example an aircraft. A partition between two adjoining toilet spaces is movably mounted and designed to be moved into an open position, in which a separation between the two toilet spaces is eliminated. In this way, two relatively small toilet spaces can be converted into a larger toilet space, which is suitable for use by persons having limited mobility, for example a person sitting in a wheelchair. However, this solution requires in minimum two toilet spaces at a common location for providing a toilet space that can be used by a person with reduced mobility.

BRIEF SUMMARY OF THE INVENTION

There may be a need to provide a lavatory unit on-board a vehicle that considers the above-mentioned space-saving requirements, i.e. that requires only a minimized space, while nevertheless allowing the use by a person with reduced mobility, such as person sitting in a wheelchair.

It should be noted that the following described aspects of the invention apply also for the lavatory unit for use by persons with reduced mobility on-board a vehicle, for the aircraft, for the use of a lavatory unit, and for the method for providing a handicapped-accessible lavatory unit on-board a vehicle.

According to the present invention, a lavatory unit for use by persons with reduced mobility on-board a vehicle is provided. The lavatory unit comprises a lavatory housing structure enclosing a lavatory interior space, a door opening in the lavatory housing structure, a toilet assembly inside the lavatory interior space, and a transition seating support for a user. The transition seating support provides a first transfer position and a second transfer position. In the first transfer position, in an open door state the transition seating support is directly accessible for a person sitting in a wheelchair that is located at least partly outside the lavatory unit such that the person can transfer to the transition seating support and vice versa. In the second transfer position, a person sitting on the transition seating support can transfer to the toilet assembly and vice versa.

According to an example, in the second transition position, the transition seating support is provided in close vicinity to a sitting support of the toilet assembly such that during a transition, a person is permanently supported in a tilt-free manner. The toilet sitting support is also referred to as toilet seat.

The term "tilt-free" relates to a support surface below an area of more than half of the person's backside or bottom. In other words, with regards to a usual upright sitting position, a person is held by a resulting support surface below the person's centre of gravity.

In an example, the wheelchair is located outside the lavatory.

According to an example, in the second transition position, a distance $D_1$ of less than approximately 15 cm between the transition seating support and a sitting support of the toilet assembly is provided.

For example the distance has a maximum of a hand's width.

According to an example, the transition seating support is temporarily arrangeable in a moving area of the toilet assembly. Upon transition to the toilet assembly, the transition seating support is removable outside the moving area of the toilet assembly.

The term "moving area of the toilet assembly" relates to an area around the toilet that is used for a normal course moving of a person using the toilet. The moving area comprises in particular a region in from of the toilet, i.e. in front of the toilet seat above a toilet bowl, e.g. the toilet seat resting on the toilet bowl, and also on the side of the seat for arranging the user's legs when sitting on the toilet seat. For example, a moving area having a distance of about 65 cm from the rear edge of a toilet seat is provided, wherein the rear edge refers to a location in which the user's back is provided with its rear face. The knees are then protruding into the moving area, of course depending on the user's sitting position on the toilet seat.

In an example, the transition seating support is a tip-up seat that is pivotable upwards for storing purpose, in which the seat surface is arranged vertically.

According to an example, a knee abutment and guiding arrangement is provided opposite the transition seating support. The knee abutment and guiding arrangement comprises a concave knee abutment recess.

The term "knee abutment surface" relates to a surface against which the user can put his knee during the transfer procedure. Hence, the user is supported and it is prevented that the user slides off the transition seating support.

In an example, a lateral protrusion or projection for lateral support for knees arranged in a vicinity of the concave abutment recess is provided for improved guidance.

The knee abutment surface provides lateral support in both sidewards directions.

In an example, a washbasin is provided in the lavatory interior space opposite the transition seating support; and the knee abutment and guiding arrangement is provided below the washbasin.

In an example, the knee abutment recess is arranged aligned with a centre axis of the washbasin.

In an example, the knee abutment recess is arranged aligned with a centre axis of the transition seating support.

In a further example, the washbasin and the transition seating support are aligned with their centre axes.

The term "concave shape" relates to a surface with a recess having a smooth contour to be able to act as a knee support. In an example, the concave shape has a minimum radius of about 20 cm and a maximum radius of about 80 cm.

According to an example, the concave abutment recess is provided with a concave shape in a horizontal direction and a concave shape in a vertical direction.

In an example, support is provided for the knees in a lateral and in a vertical direction, in particular for a vertical direction in a downward direction.

According to an example, the concave abutment recess provides a point of rotation or pivot axis for front tips of a knee of a person transferring from a wheelchair located outside the lavatory unit via the transition seating support to the toilet assembly.

According to an example, the transition seating support is at least arrangeable in the first transfer position and the second transfer position.

According to the present invention, a lavatory unit for use by persons with reduced mobility on-board a vehicle is provided. The lavatory unit comprises a lavatory housing structure enclosing a lavatory interior space, a door opening in the lavatory housing structure, a toilet assembly inside the lavatory interior space, and a transition seating support for a user. The transition seating is at least arrangeable in a first transfer position and a second transfer position. In the first transfer position, in an open door state the transition seating support is directly accessible for a person sitting in a wheelchair that is located outside the lavatory unit such that the person can transfer to the transition seating support and vice versa. In the second transfer position, a person sitting on the transition seating support can transfer to the toilet assembly and vice versa.

The term "vice versa" relates to the transfer of the person in the other direction, i.e. from the toilet assembly to the transition seating support, and from the transition seating support to the wheelchair.

This provides the advantage that the space inside the lavatory unit can actually be provided rather small, since, for example, the wheelchair stays outside the lavatory unit, respectively the lavatory interior space. The transition seating support allows and facilitates a transition from the wheelchair to the toilet assembly by providing so-to-speak an intermediate safe position for the person with reduced mobility. The person in a wheelchair can approach the lavatory unit, lock the wheelchair, i.e. safely stop the wheelchair, and then transfer to the transition seating support for achieving a transfer position inside the lavatory interior space. The door can then be closed, and the person with reduced mobility can prepare, or can get prepared, for then transferring to the toilet assembly from the transition seating support. After using the toilet assembly, the person with reduced mobility can then transfer back to the transition seating support, and from there to the wheelchair that is located outside the lavatory unit. For example, in case of a narrow aisle where a wheelchair cannot be turned, i.e. the wheelchair cannot be rotated about 90° to enter a toilet room, the invention provides nevertheless access to the lavatory, because the wheelchair can stay in the aisle. The requirements for handicapped persons for entering a lavatory are fulfilled by the transition seating support. It should be noted that, besides the actual transfer to the toilet, in which transfer the transition seating support acts as an intermediate support, the transition seating support can also be used for other purposes by the person with reduced mobility, for example for using the wash-basin, e.g. for washing hands, or cosmetic procedures.

The concept of the transition seating support can be provided especially for 37-inch lavatory spaces, for example.

The transition seating support can be implemented in different types of lavatories, and is also applicable to retrofit solutions. Depending on the lavatory wall, strengthening support may be installed for retrofit solutions.

The vehicle may preferably be an aircraft, such as an airplane or airship. The vehicle may also be a train, ship or coach.

The lavatory housing structure at least party encloses the lavatory interior space. For example, the lavatory housing structure encloses the lavatory interior space on all sides. The bottom enclosure may be provided by a cabin floor structure, and the upper enclosure may be provided by a cabin ceiling panel structure. In one example, a cabin side-wall panel structure encloses the lavatory interior space on one side, e.g. opposite the door opening.

The person sitting in the wheelchair may be a handicapped person. A handicapped person is also referred to as a person with reduced mobility (PRM). The term "handicapped" relates to people with difficulties in their walking and standing capabilities. For example, handicapped may relate to paralysis, blindness or reduced sight or vision, tremor or other limitations related with age, or muscle or bone diseases. In the context of the preset application, the term "handicapped" also comprises reduced movement capability and the like due to pregnancy. The term "handicapped" also comprises weakness related limitations. The term "handicapped" also relates to people with disabilities.

Accessible lavatories, while modified for the needs of passengers with disabilities, can be used by all passengers. The underlying presumption is that the purpose of the accessible lavatory design is to enable adult passengers to access and use a lavatory with the aid of using an on-board wheelchair. In an example, a handicapped accessible lavatory is provided. In an example, the lavatory unit is a non-wheelchair accessible lavatory, i.e. a wheelchair cannot enter the lavatory interior space.

The term "accessible" refers to a person sitting in the wheelchair can move over to the transition seating support without the need to get into an upright standing position. The "moving over" of the user is provided by moving from a seat-surface of the wheelchair to a seat-surface of the transition seating support.

The term "lavatory" refers to the total enclosure of a toilet room, rather than a washbasin or sink. Lavatory is synonymous with restroom or washroom. For example, the term lavatory is used in aviation industry to describe the toilet enclosure. The "toilet" is the actual device to which a person transfers to for hygienic functions. It is also referred to as commode, or water closet.

A "toilet compartment" is thus a facility customarily used by passengers for their hygienic functions and appearance needs. According to the present invention, an "accessible lavatory" includes the complete toilet compartment. The term "toilet enclosure" refers to an auxiliary area that may be needed, and that may be contiguous to the lavatory, that can be separated from the passenger cabin so as to provide an extended area for privacy and maneuverability for passengers with disabilities. The toilet enclosure should provide the equivalent level of privacy as a regular lavatory door.

The wheelchair may be an on-board wheelchair. An "on-board wheelchair" is a wheelchair specifically designed for the use on-board a vehicle. The on-board wheelchair must be selected with access and transfer method in mind. An on-board wheelchair does not necessarily provide the full spectrum of a wheel-chair for normal every-day use. The on-board wheelchair includes footrests, folding armrests that are movable or removable, adequate occupant restraint systems, a backrest height that permits assistance to passengers in transferring, structurally sound handles for maneuvering the occupied chair, and wheel locks or another adequate means to prevent chair movement during transfer to the transition seating support or during turbulence. The on-board wheelchair should be approximately the same height as the aircraft seat, and toilet seat.

The design and performance characteristics of the on-board wheelchair are integral to the level of accessibility afforded by an on-board accessible lavatory. Research has shown that the toilet seat and on-board wheelchair seat should be less than approximately 0.5 inches (12.8 mm) different in height to prevent injury to the transferor and transferee during dependent transfers inside the lavatory enclosure. In some cases the transfer from the aircraft seat to the on-board wheelchair is a two person dependent transfer, and one or more of the transferors may be an airline employee. In addition, the on-board wheelchair should permit assistance to be provided both at the front and rear of the chair, so that the wheelchair can be guided down the aisle of the aircraft to the accessible lavatory. The on-board wheelchair should permit the brakes to be applied from both the front and the back of the wheelchair, and also independently by someone performing an independent transfer. The on-board wheelchair casters should pivot to minimize the distance required for a chair occupied by a 95 percentile male to perform a 90° or right angle approach.

The term "transfer" relates to physical movement of a passenger between a passenger seat, and an on-board wheelchair, and/or a lavatory toilet seat, i.e. in and out of a wheelchair, or on and off of a toilet. The term "independent transfer" relates to a transfer of passengers using appropriate hand bars, hand grips, and platforms. These people do not require any assistance either in transfers or within the enclosed toilet compartment. The term "dependent transfer" relates to a transfer of passengers who require physical assistance from another person to perform the transfer. For passengers in this category, a variety of techniques may be used to lift the passengers clear off one seat, move them until they are over the other seat, i.e. the transition seating support, and then lower the passengers into a seated position.

A passenger's rotation during transfer is expressed in terms of "degrees (°) of transfer," e.g., in an, up to, 90° transfer, a passenger is pivoted through, up to, an approximately 90° arc. In a side by side or lateral transfer (0°), a passenger transfers across from seat to seat. It must be noted that there are a wide variety of transfer techniques and toileting methods, each with their own spatial requirements. The space required for 0° up to 90° transfers of a 95 percent male with a personal attendant who is also a 95 percent male should accommodate the needs of most other passengers with disabilities who use transfer techniques different from those described herein, and whose method of using the toilet may not require transfer, or who use mobility aids. It has been noted that aircraft are designed for the 95 percentile male.

The term "95 percent male" is used as definition in the field of anthropometry, i.e. measurements of human individuals. The "95 percent male" is also referred to as $95^{th}$ percentile and relates to body measurements of individuals where only 5% are larger, i.e. 95% stay within the measurements/figures. The exact figures can be taken from, for example, standard definitions such as in the NASA standard 3000T or other norms, for example EN ISO 7250 or DIN 33402.

The fundamental principles for recommendations are that the accessible lavatory must permit a lateral (0°) or up to an approximately 90° dependent transfers of a 95 percentile male by a 95 percentile male in an enclosed lavatory space.

In an example, a transfer rotation of a handicapped person is limited to approximately 90° for each transition or transfer step.

The transition seating support allows the seating of a handicapped person from a wheelchair onto a toilet by two maximal approximately 90° transfer steps or transfer movements, i.e. approximately 90° from the wheelchair to the transition seating support, and approximately 90°, or less, from the transition seating support to the toilet assembly. The second transfer can be provided with approximately 45° in case of a rotated arrangement of the toilet assembly with relation to the lavatory unit.

It should be noted that lateral transfer designs are recommended. A lateral transfer minimizes the "exposure time" during a transfer. Exposure time is the time a person would be at risk to falling or being dropped. In a lateral transfer, the person has either the on-board wheelchair, the transition seating support or the toilet directly under them at all times, in a 90° transfer there is open space between the two seating surfaces, e.g. the wheelchair and the next seating surface. Lateral transfers are also preferred by people who perform independent transfers. In some instances an in-between angle for the transfer may be appropriate.

The terms "horizontal" and "vertical" relate to situations of normal operation when the vehicle is arranged in a horizontal manner.

In an example, a washbasin is provided inside the lavatory unit. In an example, the transition seating support provides a seating position for the user, in which the user sits in front of a washbasin provided inside the lavatory unit.

In an example, the transition seating support is provided as a stowable seat. The transition seating support may be provided as a tip-up seat. In one example, the transition seating support is provided as a fixed tip-up seat. In another example, the transition seating support is provided as a horizontally sliding tip-up seat. In another example, the transition seating support is provided as a powered sliding tip-up seat.

The tip-up seat may also be referred to as a foldable seat. The transition seating support comprises a seat panel supported by a hinge. The seat panel is movable between a resting position, in which the seat panel is hanging downwards, and a transition supporting position, in which the seat panel is arranged approximately horizontally. In the transition supporting position, support means may be arranged below the seat panel.

In an example, a fixation device for releasably securing a wheelchair is provided on or in the vicinity of a door frame portion of the door opening.

According to an example, the transition seating support is at least arrangeable in the first transfer position and the second transfer position.

According to an example, the transition seating support is a movable seat translatable in a horizontal direction between a position closer to the wheelchair and a position closer to the toilet assembly.

The translation between the first and second position may be provided manually, for example by the user himself or by an assisting person. The translation between the first and second position may be supported by an actuating mechanism. The translation between the first and second position may be provided by a controllable actuating mechanism.

In an example, the movable seat comprises actuation means for the translation between the first and the second position. The actuating means may comprise a spindle drive, for example with a shaft joint motor fixed on a tip-up seat or a rail. Switching means can be provided for control of the translation movement of the seat.

Of course, different types of handles or bars may be provided inside the lavatory unit.

According to an example, in the first the transfer position, the transition seating support is arranged inside the lavatory interior space between the toilet assembly and the door opening. The transition seating support is extending at least partly into the door opening. The transition seating support is accessible for the person sitting in a wheelchair that is located in front of the door opening.

This provides the advantage that the person sitting in a wheelchair can approach the lavatory unit with the wheelchair such that the wheelchair stays in front of the lavatory unit's opening. The person sitting in a wheelchair can then transfer to the transition seating support that is arranged inside the lavatory interior space, but provided in the door opening to allow a direct transfer from the wheelchair onto the transition seating support, thus providing enhanced security for the handicapped person, for example.

The term "extending at least partly into the door opening" refers to an arrangement where the seat surface of the transition seating support is accessible for a user from the outside, i.e. the user can directly take place on the transition seating support without the need to first enter the lavatory. In the seated state, the user is located inside the lavatory unit.

In an example, the transition seating support is provided in a fixed manner, and the first transfer position and the second transfer position relate to the same transfer position.

In another example, the transition seating support is provided movable at least between the first transfer position and the second transfer position.

According to an example, in the first transfer position, the transition seating support is arranged at least partly outside the lavatory interior space. The transition seating support is movable at least between the first transfer position and the second transfer position.

This provides the advantage that the person sitting in a wheelchair can directly access the transition seating support in the space outside the lavatory interior space, for example allowing an easier transition from the wheelchair to the transition seating support. The transition seating support is then moved, together with the person with reduced mobility, to the interior space of the lavatory unit, for example to close the doors and to further provide transition from the transition seating support to the toilet assembly.

In an example, the transition seating support is a movable seat translatable in a horizontal direction between a position closer to the door opening and a position closer to the toilet assembly.

According to an example, the transition seating support is movable at least partly underneath a seating support of an on-board wheelchair for facilitating a transfer from the wheelchair to the transition seating support.

For example, the on-board wheelchair is provided with a matching seating support construction to allow the positioning of the transition seating support at least partly underneath, and then a so-to-speak dropdown from the seating support of the on-board wheelchair to the transition seating support, thus facilitating the transfer from the wheelchair to the transition seating support.

According to an example, the transition seating support is movable at least partly over the toilet assembly.

This provides the advantage that the transition situation for the transfer from the transition seating support to the toilet assembly is further improved by, for example, a partly overlapping of the transition seating support and the toilet assembly, for example the transition seat.

For example, the transition seating support is slideable over the toilet assembly such that the user can rest on the transition seating support in case he/she does not want to use the toilet, but wants to use the lavatory for other purposes, for example for using the wash-basin.

In an example, the transition seating support can be brought into a position completely arranged over the toilet assembly. In another example, the transition seating support covers only a part of the toilet assembly.

According to an example, a transition seat extension is provided at least temporarily between the transition seating support and a toilet seat of the toilet assembly.

The transition seat extension may be a slideable extension attached to the transition seating support.

The transition seat extension may be an extension element pivotable mounted to the inside surface of the lavatory housing structure.

The transition seat extension provides the advantage to allow a closer movement of the person with reduced mobility towards the toilet assembly to then further facilitate the transfer to the toilet assembly, i.e. a toilet seat. Of course, similar is the case for the transition from the toilet assembly to the transition seating support and from the transition seating support onto the wheelchair.

According to an example, the transition seating support comprises a sitting surface comprises two upper-leg resting segments extending from a bottom resting segment. A cut-out is provided between the two upper-leg resting segments for leg positioning of an assisting person.

This provides the advantage that in case assisting persons are needed, the assisting person, for example holding and lifting the handicapped person to or from the wheelchair, can approach the person with reduced mobility closer, such that the lifting is facilitated.

According to an example, the transition seating support is attached to an inner side of a portion of the lavatory housing structure, on which outer side a cabin attendant seat is provided. The cabin attendant seat and the transition seating support are provided by a bi-functional seating support.

This provides the advantage that the same seat can be used for two different purposes, i.e. two different functions. This allows weight-saving and also generates synergetic effects, leading also to cost benefits and the like.

In an example, guiding means and a slot opening are provided in the lavatory housing structure. A seating element is slideable between a first position and a second position. In the first position, the seating element is arranged outside the lavatory housing, the seating element acting as the cabin attendant seat (CAS). In the second position, the seating element is arranged inside the lavatory housing, the seating element acting as the transition seating support.

The guiding means may be provided as a rail system for slidingly supporting the seating element. The slot opening may be provided as a cut-out in the lavatory housing structure.

In an example, a cut-out and rotating support means for a seat are provided in the lavatory housing structure. In an option i), the seat is mounted rotatably around a vertical axis between a first rotation position and a second rotation position. In the first rotation position, the seat is facing to a cabin space, the seat acting as the cabin attendant seat. In the second rotation position the seat is facing the lavatory interior space, the seat acting as the transition seating support. In an option ii), the seat is mounted rotatably around a horizontal axis between a first rotation position and a second rotation position. In the first rotation position, the seat is facing to a cabin space, the seat acting as the cabin attendant seat. In the second rotation position, the seat is facing the lavatory interior space, the seat acting as the transition seating support.

In the first case i), the seat is provided with a first and second seat panel. The first seat panel is a seat surface, and the second seat panel is a backrest. The seat panel can be folded parallel to the second seat panel for rotating between the first and second rotation position.

In the second case ii), the seat is provided with a first and a second seat panel. In the first position, the first seat panel is arranged as seat surface, and the second seat panel is provided as backrest, whereas in the second position, the second seat panel is arranged as the seat surface and the first seat panel is provided as backrest.

The toilet assembly may be provided with an inclined angle to a sidewall of the lavatory housing structure. For example, the toilet assembly, i.e. the toilet itself, is provided in an angle of 10° to 80°, for example 30° to 60°, or in a further example, approximately 45°.

According to the present invention, also an aircraft with a fuselage structure enclosing a cabin space and at least one lavatory unit is provided. At least one lavatory unit is provided as a lavatory unit according to one of the above-mentioned examples.

In an example, the aircraft has at least one door in the fuselage structure. The cabin comprises a door exit/entry area adjacent to the door, and a lavatory unit next to the exit/entry area is provided according to one of the examples above. The lavatory unit according to the present invention is preferably arranged next to a forward door on a portside of the aircraft. The forward door on the portside of the aircraft is also referred to as door A. Of course, also lavatories at other locations throughout the aircraft can be provided.

According to the present invention, also the use of a lavatory unit according to one of the above-mentioned examples in an aircraft with a fuselage structure enclosing a cabin space is provided.

According to the present invention, a method is provided for providing a handicapped accessible lavatory unit on-board a vehicle, comprising the following steps: a) providing a lavatory housing structure enclosing a lavatory interior space with a toilet assembly inside, and a door opening in the lavatory housing structure; and b) providing a transition seating support for a user.

In an open door state, a person sitting in a wheelchair that is located outside the lavatory unit can directly access the transition seating support arranged in the first transfer position and for transferring from the wheelchair to the transition seating support and vice versa. The person sitting on the transition seating support arranged in the second transfer position can transfer to the toilet assembly and vice versa.

According to the present invention, the use of a lavatory unit for handicapped persons, for example, or other persons with reduced mobility, is provided by the lavatory unit that is equipped with a transition seating support allowing and facilitating the transfer from a wheelchair to the toilet assembly, i.e. the transition seat. Since the transition seating support can be accessed by the person with reduced mobility while being outside the lavatory unit, the need to provide additional space inside the lavatory unit for parking the wheelchair is omitted. Rather, the space outside the lavatory unit, e.g. the floor space of an aisle, is temporarily used for storing the wheelchair. Thus, although the lavatory unit itself is provided with minimized dimensions, the usable space available for the use by a person with reduced mobility, for example sitting in a wheelchair, is enlarged. The so-to-speak connecting element between the inside and the outside, i.e. the region where a wheelchair can be parked outside the lavatory unit and the toilet inside the lavatory unit, is provided by arranging the transition seating support.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 12 schematically shows a vertical section of an example of a transition seating support;

FIG. 13a shows a further example of a transition seating support in a plan view;

FIG. 13b shows a schematic elevation of the transition seating support of FIG. 13a;

DETAILED DESCRIPTION

Figure 1:
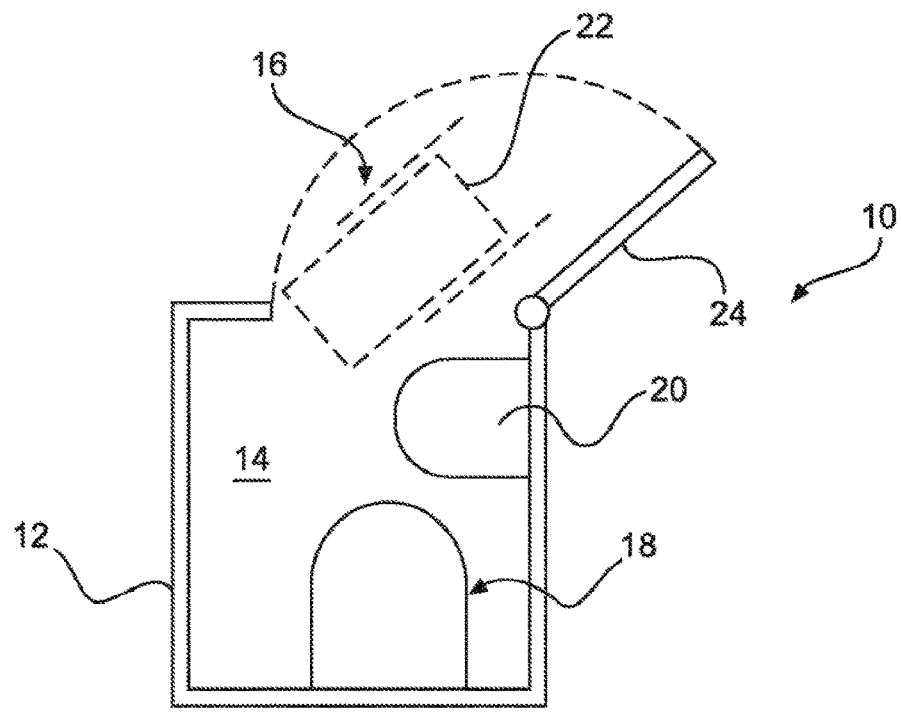
FIG. 1 shows a schematic plan view of an example of a lavatory unit.

FIG. 1 shows a lavatory unit 10 for use by persons with reduced mobility vehicle. The lavatory unit 10 comprises a lavatory housing structure 12 enclosing a lavatory interior space 14. Further, a door opening 16 in the lavatory housing structure 12 is provided. Still further, a toilet assembly 18 is shown inside the lavatory interior space 14. Still further, a transition seating support 20 is provided for a user. The transition seating support provides a first transfer position and a second transfer position (shown in more detail below). In the first transfer position, in an open door state, the transition seating support 20 is directly accessible for a person sitting in a wheelchair that is located at least partly outside the lavatory unit 10 such that the person can transfer to the transition seating support 20 and vice versa. In FIG. 1, a wheelchair 22 is shown with dotted lines. In the second transfer position, a person sitting on the transition seating support 20 can transfer to the toilet assembly 18 and vice versa. As an example, the door opening 16 can be provided with a pivoting door element 24. However, also sliding doors, rotating doors or folding doors or doors with rolling elements can be provided.

For example, the lavatory unit 10 may be provided as a non-wheelchair-accessible lavatory, as indicated.

In a further example, an additional curtain is provided in the corridor space outside the lavatory such that the wheelchair is hidden from the cabin to provide at least a bit of privacy for the person transferring to the transition seating support. Upon transfer to the interior space of the lavatory unit, the wheelchair is moved out of the door entry opening, e.g. by a flight attendant, such that the door can be properly closed.

Figure 2:
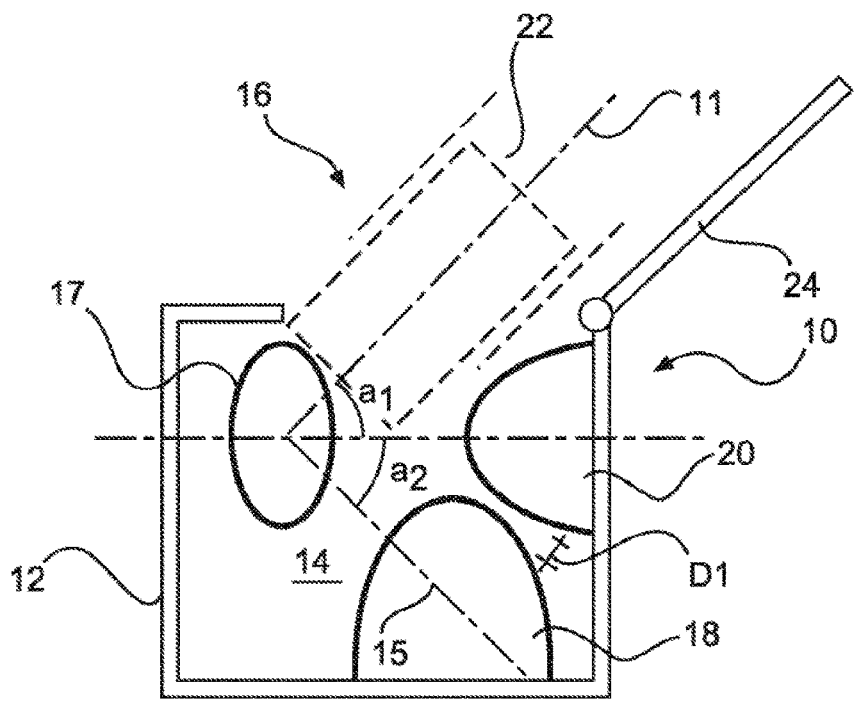
FIG. 2 shows a schematic plan view of another example of a lavatory unit.

FIG. 2 shows a further example of the lavatory unit 10. A distance $D_1$ of less than approximately 15 cm is provided between the transition seating support and a sitting support of the toilet assembly is provided. For example the distance $D_1$ has a maximum of a hand's width.

The wheelchair 22 can approach the door entry opening in an oblique manner, e.g. diagonally. A first dotted line 11 indicates a longitudinal axis of the wheelchair 22. A second dotted line 13 indicates a centre axis of the transition seating support 20. A third dotted line 15 indicates an axis to a position in the middle of the toilet assembly 18. The transfer to the transition seating support 20 is provided in an angle $\alpha_1$ of about 45°. The transfer from the transition seating support 20 to the middle of the toilet assembly 18 is provided in an angle $\alpha_2$ of about 45°.

Figure 3:
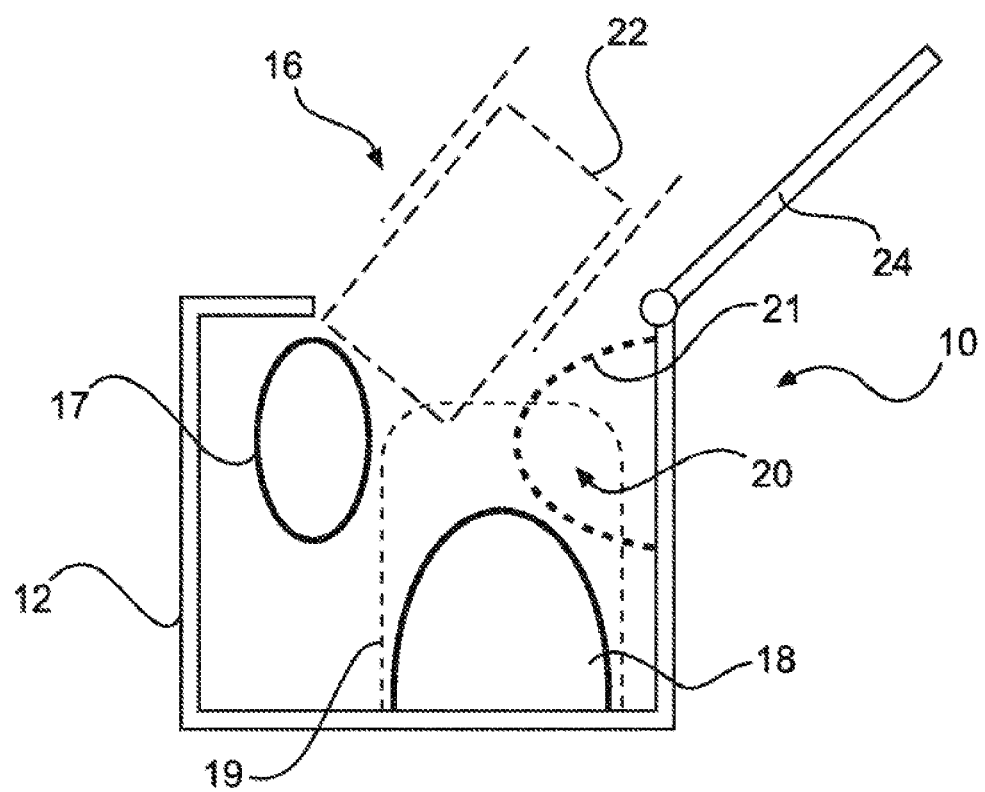
FIG. 3 shows a schematic plan view of a further example of a lavatory unit.

FIG. 3 shows a still further example of the lavatory unit 10. As an option, a washbasin 17 is indicated. The transition seating support 20 is temporarily arrangeable in a moving area 19 of the toilet assembly. The transition seating support 20 is removable outside the moving area of the toilet assembly, e.g. upon transition to the toilet assembly. This is indicated with a dotted line 21. As an example, the transition seating support 20 is provided as a tip-up seat.

Figure 4A:
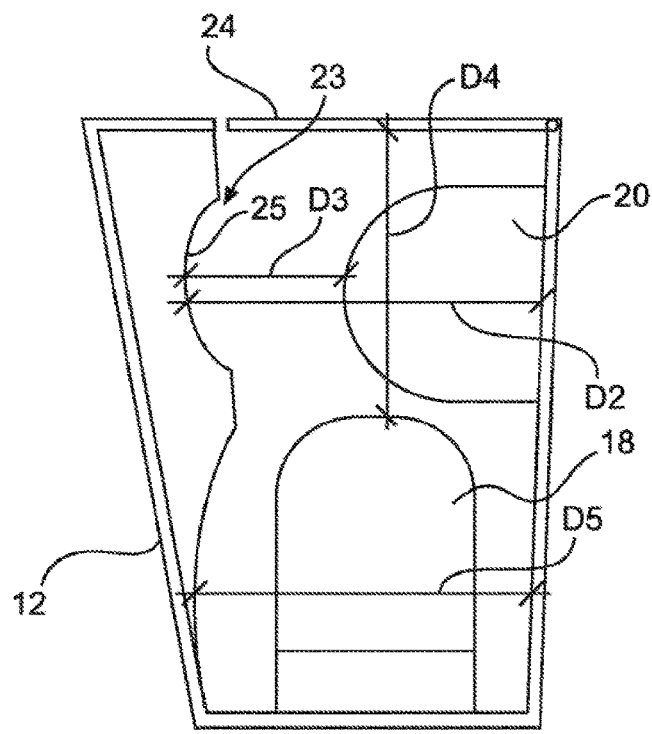
FIG. 4a shows a schematic plan view of a still further example of a lavatory unit.

FIG. 4a shows another example of the lavatory unit 10, according to which a knee abutment and guiding arrangement 23 is provided opposite the transition seating support 20. The knee abutment and guiding arrangement 23 comprises a concave knee abutment recess 25. In order to ensure a sufficient support and guidance, a minimum distance of approximately 55 cm, and a maximum distance of approximately 75 cm is provided. In an example, a distance $D_2$ of about 60 to 65 cm is provided, wherein the distance is measured from the rear edge of the seating support to the knee abutting surface. The rear edge is the back side of the seating support and usually also relates to the wall's surface, or seating backrest, against which the user can lean during use of the seating support. For example, a distance $D_3$ between the abutment recess 25 and a front edge of the transition seating support of about 20 to 35 cm is provided.

Figure 4B:
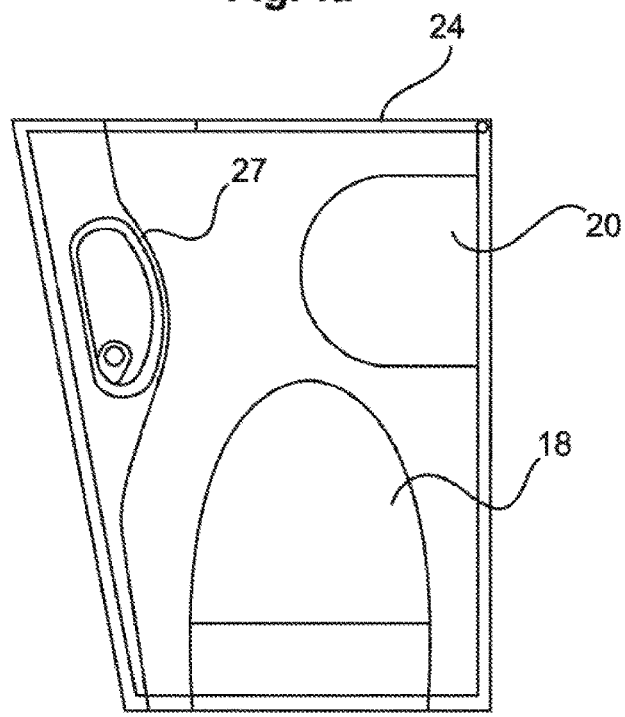
FIG. 4b shows a plan view of the example of FIG. 4a in view plane above a washbasin.

In FIG. 4b, a washbasin 27 is shown as an option, the washbasin arranged above the knee abutment and guiding arrangement 23 with the concave knee abutment recess 25. (In the drawing of FIG. 4b, the concave knee abutment recess 25 is not shown.) In an example, the washbasin is aligned with the transition seating support 20. In another example, the washbasin is displaced sidewards, e.g. towards the toilet assembly. In a still further example, the drainage of the washbasin is arranged in a displaced manner, e.g. towards the toilet assembly. This can be provided for the aligned washbasin and also for the displaced washbasin.

Figure 4C:
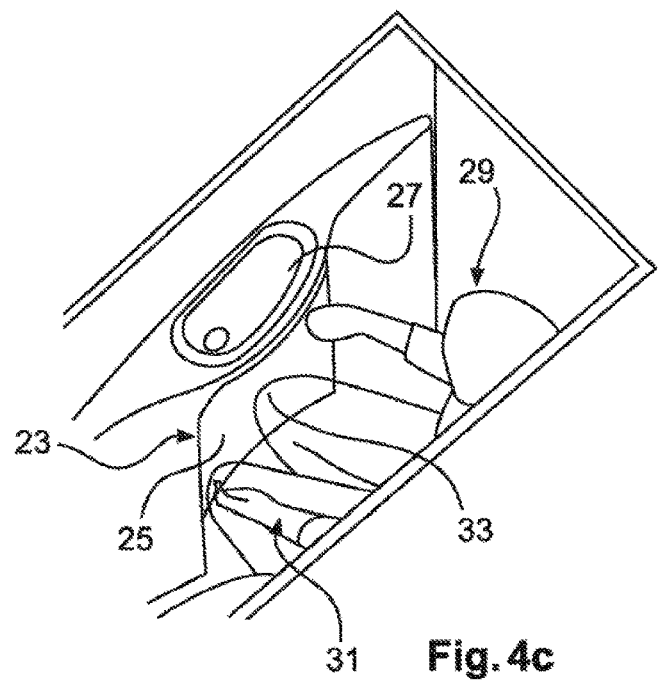
FIG. 4c shows a perspective of the example of FIGS. 4a and 4b with a passenger located on a transition seating support inside a lavatory interior space.

FIG. 4c shows a perspective view of a part of the lavatory interior space 14. A person 29 is shown arranged on the transition seating support 20, e.g. during transfer to the toilet assembly 18. The person is shown with upper legs 31 extending towards the part below the washbasin 27. The legs 31 are arranged with knees 33 in the vicinity of the concave knee abutment recess 25 of the knee abutment and guiding arrangement 23. Thus, guiding support for the person 29 is provided.

Figure 4D:
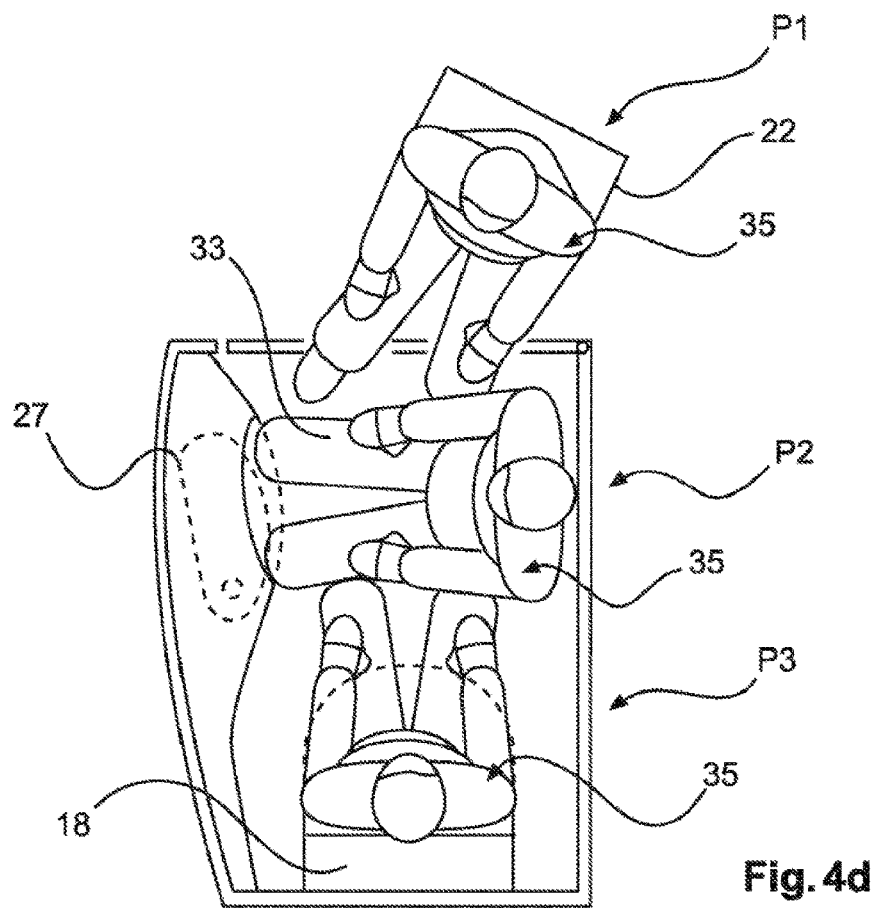
FIG. 4d shows a plan view of the example of FIGS. 4a, 4b and 4c with a passenger indicated in different positions during transfer from a wheelchair onto a toilet assembly.

FIG. 4d shows an overview of different positions of a person 35 during transfer from the wheelchair 22 to the toilet assembly 18 and vice versa. In a first position P1, the person 35 is shown sitting in the wheelchair 22. In a second position P2, the person 35 is shown sitting on the transition seating support 20. In a third position P3, the person 35 is shown sitting on the toilet assembly 18. As can be seen, the knees 33 of the person 35 are arranged in the vicinity of the concave knee abutment recess 25 during transfer. In other words, the person so-to-speak pivots around this concave knee abutment recess 25, the latter providing support to avoid that the person, with reduced mobility, falls off the transition seating support 20.

It must be noted that aspects relating to the transfer procedure are also described below in relation with other exemplary embodiments, such as examples having a movable (via translation) transition seating support 20. These aspects are also applicable for the exemplary embodiments described above, such as the examples having a fixedly arranged transition seating support 20, which may be temporarily removable for example via tilting upwards or downwards.

Figure 5:
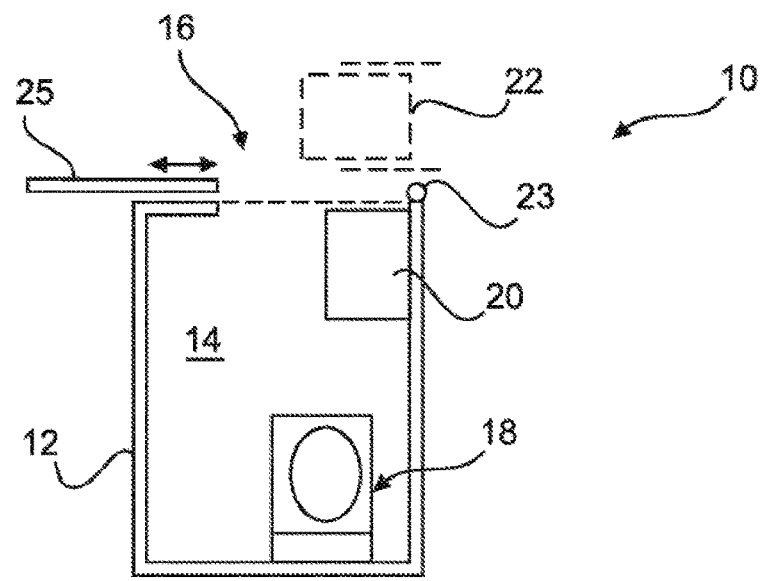
FIG. 5 shows a schematic plan view of an example of a lavatory unit.

FIG. 5 shows the lavatory unit 10 comprising the lavatory housing structure 12 enclosing the lavatory interior space 14. In the first transfer position, in an open door state, the transition seating support 20 is directly accessible for a person sitting in the wheelchair that is located outside the lavatory unit 10 such that the person can transfer to the transition seating support 20 and vice versa. As an option, a wheelchair fixation device 23 may be provided outside the lavatory unit 10, for example in the vicinity of a doorframe area. As an example, the door opening 16 can be provided with a sliding door element 25. However, also pivoting or rotating doors or folding doors or doors with rolling elements can be provided.

For example, the lavatory unit 10 may be provided as a non-wheelchair-accessible lavatory, as indicated.

It must be noted that the wheelchair is shown in exemplary positions in relation with the door opening of the lavatory. Of course, other positions (not shown) are also provided. The positioning of the wheelchair is also depending on the spatial relations of the area in front of the lavatory, i.e. where the wheelchair is temporarily parked. For example, the wheelchair is parked such that a lateral transfer to the transition seating support is provided. In another example, the wheelchair is parked such that a 90° transfer to the transition seating support is provided.

In a further example, the person transfers to the transition seating support in a first position, such as transverse to the flight direction, in flight direction or against flight direction. Before transferring to the toilet assembly, the person may change the position. For example, the person is transferring to the transition seating support from the wheelchair in a position looking away from the opening, and is later turning on the transition seating support such that the view is transverse to the initial direction.

Figure 6:
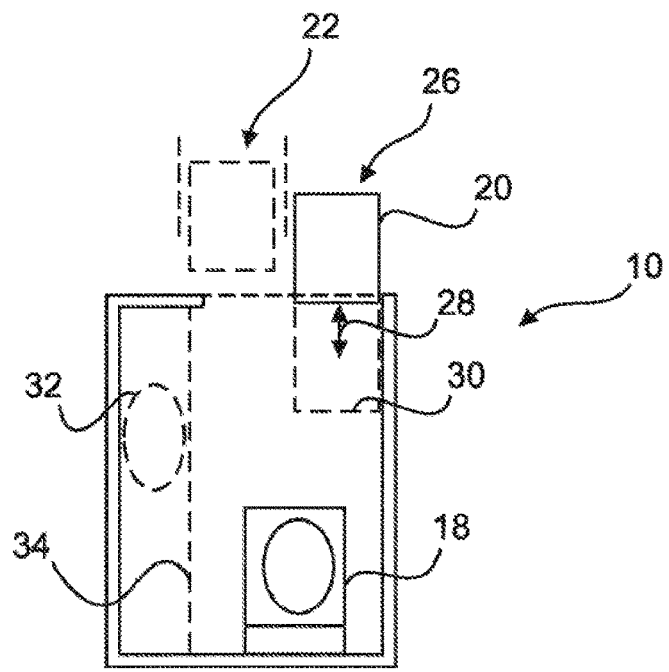
FIG. 6 shows a plan view of a further example of a lavatory unit.

FIG. 6 shows an example of the lavatory unit 10 where the transition seating support 20 is arranged at least partly outside the lavatory interior space in the first transfer position. In FIG. 6, the transition seating support 20 is shown in the first transfer position, indicated with reference numeral 26. A double arrow 28 indicates the movability of the transition seating support 20. A dotted frame 30 indicates the above-mentioned second transfer position. The transition seating support 20 is thus movable at least between the first transfer position 26 and the second transfer position 30. For example, the wheelchair 22 can be arranged next to the transition seating support 20 in the first transfer position 26.

As indicated with dotted lines in FIG. 6, the lavatory unit 10 may be equipped with a wash-basin 32, arranged in relation with a horizontal surface 34. It must be noted that the provision of the wash-basin 32 is shown as an option in FIG. 6, but is also provided as an option for other embodiments of the other figures.

It must be noted that the illustrations only indicate the narrow spatial relations that may be provided in a lavatory unit for on-board an aircraft without showing the spatial relations in scale. For example, in a transfer position on the transition seating support, the person may nearly touch an opposing wall, for example, a base structure or lower wall of a wash-basin arrangement.

Figure 7A:
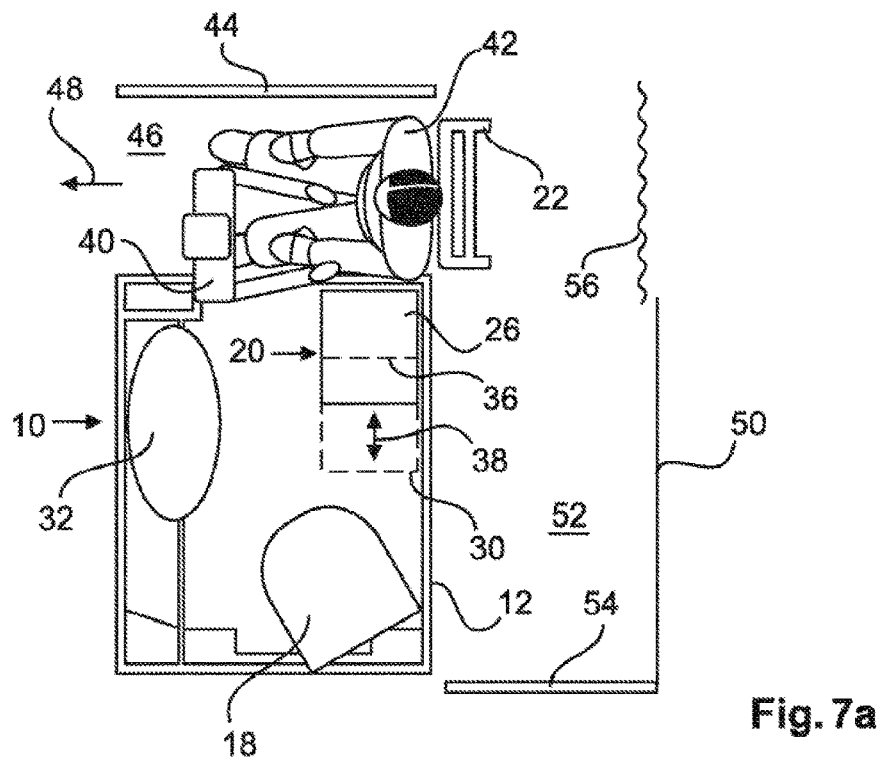
FIG. 7a shows a further example of a lavatory unit.

FIG. 7A shows a further example, where the transition seating support 20 is a movable seat 36 translatable in a horizontal direction, as indicated with a double arrow 38, between a position closer to the wheelchair 22 and a position closer to the toilet assembly 18.

In a further example, not shown, the movable transition seating support 20 is provided in combination with the examples of FIGS. 1 to 4, and in particular with the concave knee abutment recess 25. The latter provides additional support during the transfer from the movable transition seat extension 20 to the toilet assembly 18.

For example, the transition seating support 20 is arranged inside the lavatory interior space in the first transfer position, indicated with the reference numeral 26. The transition seating support 20 is arranged closer to the door opening. A dotted frame indicates the second transfer position 30, into which the transition seating support 20 can be moved.

As an example, an assisting person 40 is shown in FIG. 7A, for assisting the transfer of a handicapped person 42 from the wheelchair 22 to the transition seating support 20.

Further, it must be noted that the toilet assembly 18 is shown in a slightly inclined manner, i.e. in an angle, i.e. rotated towards the transition seating support 20 for further facilitating the transfer from the handicapped person 42 via the transition seating support 20 to the toilet assembly 18. It must be noted that this shown as an option, i.e. the feature of the inclined arranged toilet can also be omitted. It must be noted further, that the inclined toilet arrangement is also provided for the other embodiments of the other figures and described in more detail below and above.

Further, the surrounding of the lavatory unit 10, for example in an aircraft is indicated: A first line 44 indicates an interior wall of a galley provided opposite the lavatory unit 10 on the other side of an ail area 46. An arrow 48 indicates an access to an adjoining cockpit area. Further, a second line 50 indicates a separation from a door entry area 52, the door shown with a double line 54 for simplicity, from a cabin space arranged to the right. Further, a curtain, or other separating component/element 56 can be provided for separation from the cabin space.

The space outside the lavatory interior space, e.g. the adjacent aisle space and the door entry/exit area thus form a toilet enclosure.

Figure 7B:
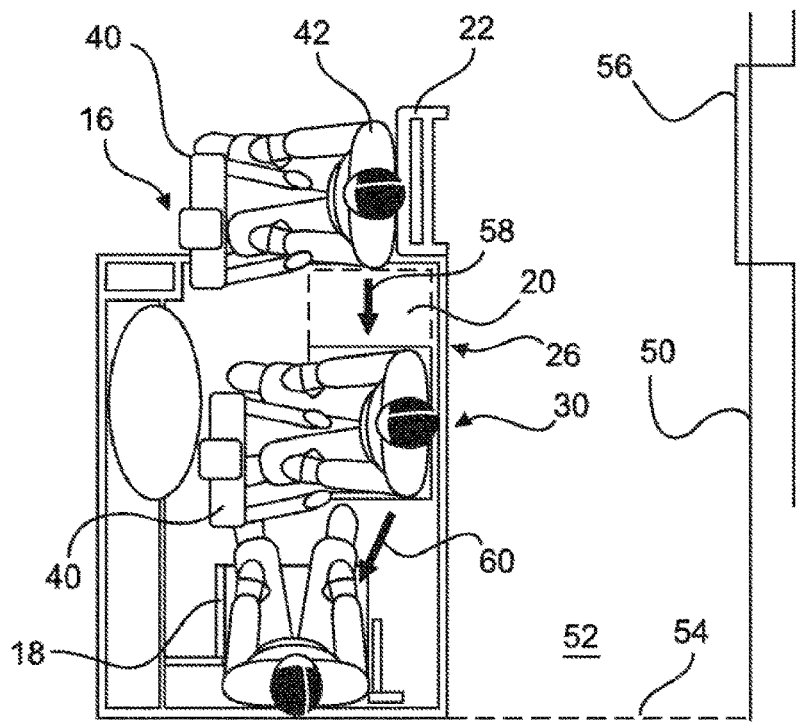
FIG. 7b shows yet another example of a lavatory unit.

FIG. 7B shows a further example indicating different stages during the transition procedures, which shall be described in the following with the general principle steps. First, the lavatory door is open. Next, the transition seating support 20 is prepared (see also below). The wheelchair 22 is positioned next to the lavatory door opening 16. As an option, the curtain 56 can be closed to provide a visual protection for the person with reduced mobility for passengers' direct view located in the cabin, not further shown. The person with reduced mobility, i.e. the handicapped person 42 is then positioned on the transition seating support 20, for example with the help and support of the assisting person 40. Next, the transition seating support 20 is moved from the first transfer position 26 to the second transfer position 30, as indicated with a first arrow 58. Next, the handicapped person 42 can be transferred to the toilet assembly 18, as indicated with a second arrow 60. For example, the assisting person 40 can also provide support for preparing the handicapped person 42 for the use of the toilet assembly 18.

Figures 8, 9:
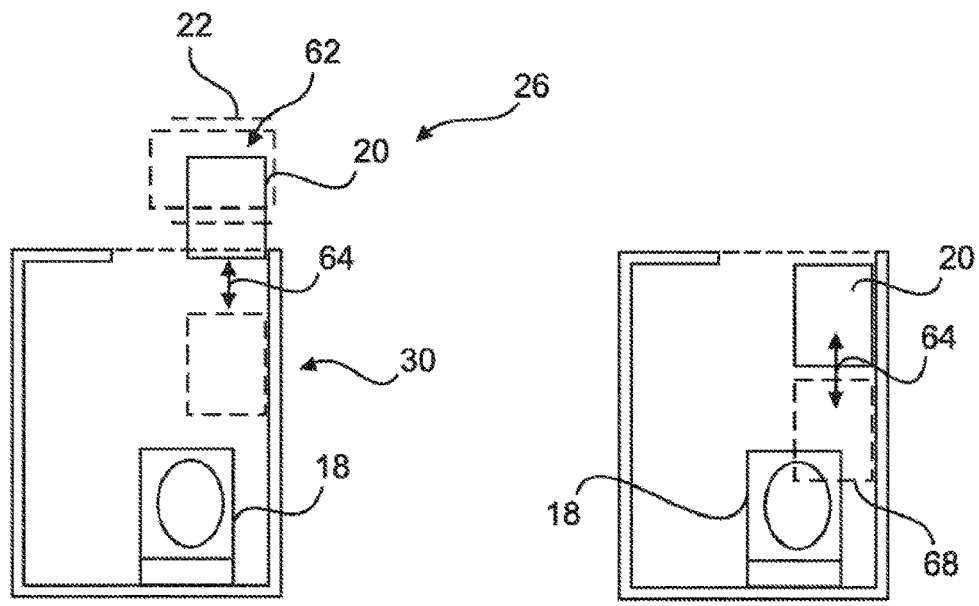
FIG. 8 shows a further example of a lavatory unit with a transition seating support that can be arranged at least partly outside the lavatory unit.
FIG. 9 shows an example of a lavatory unit with a transition seating support arranged inside the lavatory interior space.

FIG. 8 shows a further example, where the transition seating support 20 is moveable at least partly underneath a seating support 62 of an on-board wheelchair or other wheelchair, as indicated with the dotted wheelchair 22, for facilitating a transfer from the wheelchair 22 to the transition seating support 20. An arrow 64 indicates the movability between the first transfer position 26 and the second transfer position 30.

FIG. 9 shows a further example, where the transition seating support 20 is movable at least partly over the toilet assembly 18, as indicated with double arrow 66. The position, in which the transition seating support 20 is moved partly or completely over the toilet assembly 18, is indicated with a dotted frame 68.

Figures 10, 11:
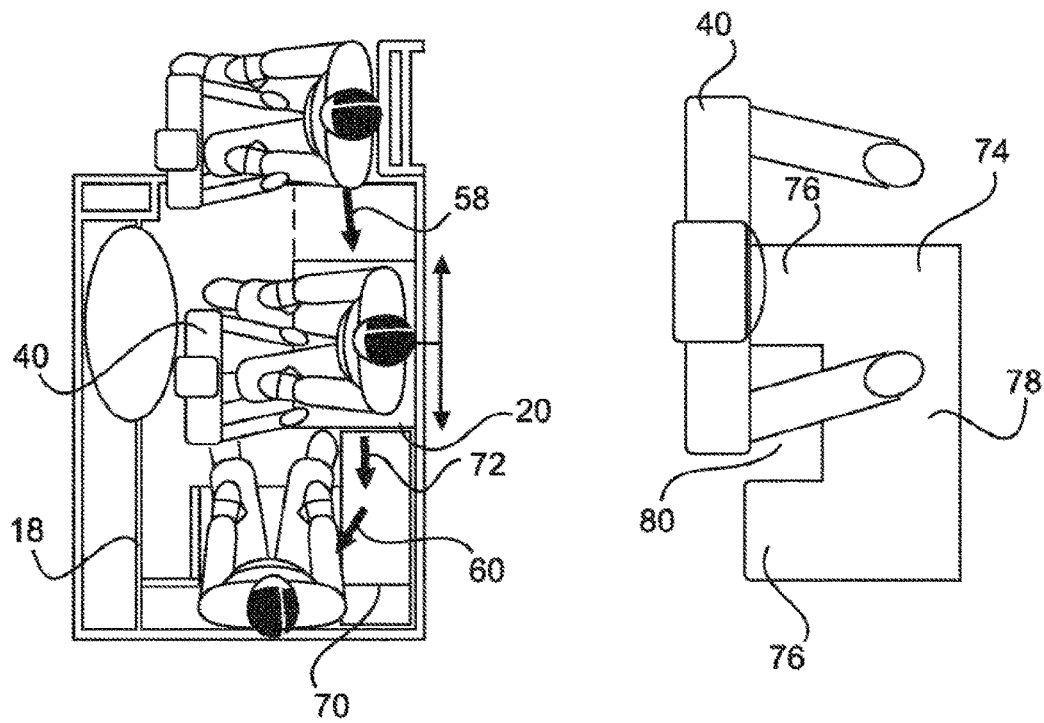
FIG. 10 shows an example of a lavatory unit in relation with three different stages of use in relation with an assisting person.
FIG. 11 shows an example of a transition seating support.

According to a further example, shown in FIG. 10, a transition seat extension 70 is provided at least temporarily between the transition seating support 20 and a toilet seat (not shown in detail) of the toilet assembly 18. The transition seat extension 70 further supports the transfer movement, which can be supported by the assisting person 40, as indicated. The intermediate step provided by the transition seat extension 70 is indicated with an arrow 72 in addition to the first arrow 58 for the first transfer from the wheelchair to the transition seating support 20, and the second arrow 60 indicating the transfer to the toilet assembly 18.

In a further example, not shown, the transition seat extension 70 is provided in combination with the examples of FIGS. 1 to 4, e.g. the concave knee abutment recess 25.

The transition seat extension may be provided movable to serve temporally as additional support. In another example, the transition seat extension is fixedly installed.

However, it must be noted that the assisting person 40 is shown in the figures as an option only. Of course, also the self-supported transfer of the handicapped person 42 or other person with reduced mobility from a wheelchair, for example, may also be provided.

FIG. 11 shows a detail of an example of the transition seating support 20, comprising a sitting surface 74 comprises two upper-leg resting segments 76 extending from a bottom resting segment 78. A cut-out 80 is provided between the two upper-leg resting segments 76 for leg positioning of an assisting person, as indicated with the assisting person 40. Thus, the handling comfort for the person with reduced mobility is increased and the positioning procedure for assistant is provided in an optimized ergonomic way.

The transition seating support 20 may be provided as a storable seat 82, as indicated in FIG. 12, illustrating a folded-up state 84 in the lower half and a folded-away state 86 in the upper half. A seating surface 88 may be attached to a wall of the cabin structure 90 via a hinge element 92. The resulting up-folding movement is indicated with an arrow 94. A support structure 96, only schematically shown, can temporarily be provided to ensure proper stability. In another example, the seat is suspended by a suspending support arrangement. Of course, also other mechanisms for load bearing are provided. One or several support elements may be provided. Of course, also a seating support that can be folded down for the opened use state can be provided. In a further example, also not shown, the transition seating support 20 is provided as a fixed seating support.

For example, the transition seating support 20 is provided as a horizontally sliding transition seating support, as indicated with an arrow 98 in FIG. 13A. For example, three different positions can be preset in a sliding mechanism 102, also shown in FIG. 13B. The different positions 100 are indicated with three circles with different numerals inside. Of course, also adjustability in a horizontal and a vertical direction can be provided, as indicated with double arrow 104.

The horizontally sliding seating support can be provided as a horizontally sliding tip-up seat, or fold-up or fold-down seat, or also as a fixed seat in a horizontally sliding mechanism.

Figure 14A:
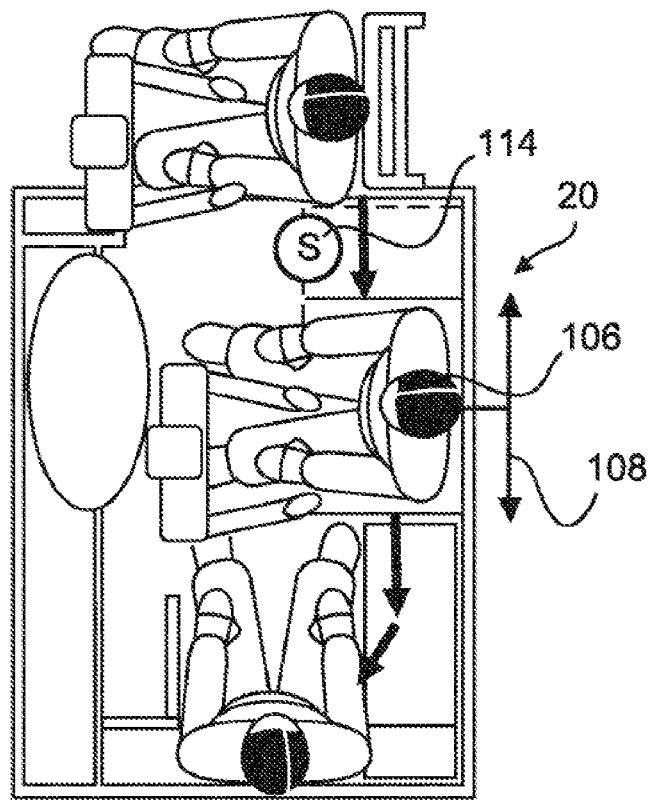
FIG. 14a shows a further example of a lavatory unit with a transition seating support in a plan view.
Figure 14B:
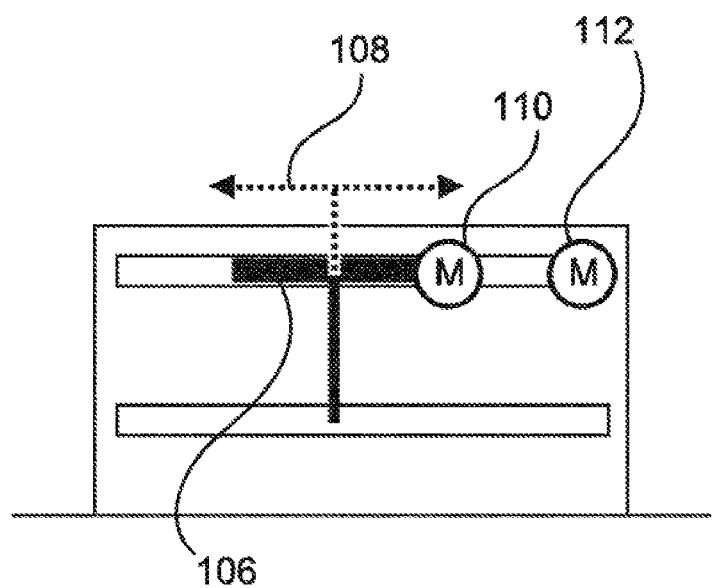
FIG. 14b shows the transition seating support of FIG. 14a in an elevation view.

In another example, shown in FIG. 14A and FIG. 14B, the transition seating support 20 is provided as a powered sliding seat 106, providing a transition movement, indicated with double arrow 108. The powered seat can also be provided as a power tip-up, fold-down or fold-up seat, or as a fixed seat being slideable by a drive mechanism. For example, a drive mechanism 110 is attached to the seating support 106. In another example, a drive mechanism 112 is provided attached to a wall structure, for example also connected to a rail or the wall. For activating the drive mechanism, a switch 114 can be provided in the vicinity of the transition seating support 20.

For example, a spindle drive with shaft joint can be provided. In another example, a motor is fixed on the rail. The spindle drive with shaft joint motor can also be provided fixed on the seat, for example the tip-up seat.

In a further example, not shown, the transition seating support 20 of FIGS. 12 to 14B is provided in combination with the examples of FIGS. 1 to 4, e.g. in particular with the provision of the transition seating support 20 in the moving area relating to the use of the toilet assembly and with the concave knee abutment recess 25.

In a further example, the transition seating support 20 is attached to an inner side 114 of a portion of the lavatory housing structure 12, on which outer side a cabin attendant seat 116 is provided. The cabin attendant seat and the transition seating support 20 are provided by a bi-functional seating support 118, which shall be described in the following with three different examples. The cabin attendant seat 116 is a seat element for cabin attendant staff members that is used during takeoff and landing phases, and that is not used, for example, during embarkation and disembarkation of the passengers, for example because the seat is located in a door entry/exit area. The cabin attendant seat may be equipped with seatbelts for the cabin attendant staff member. For example, the cabin attendant seat is also not used during the flight phase of the aircraft, in which flight phase, passengers are allowed to move on-board the aircraft, and for example to use the lavatory unit.

Figure 15A:
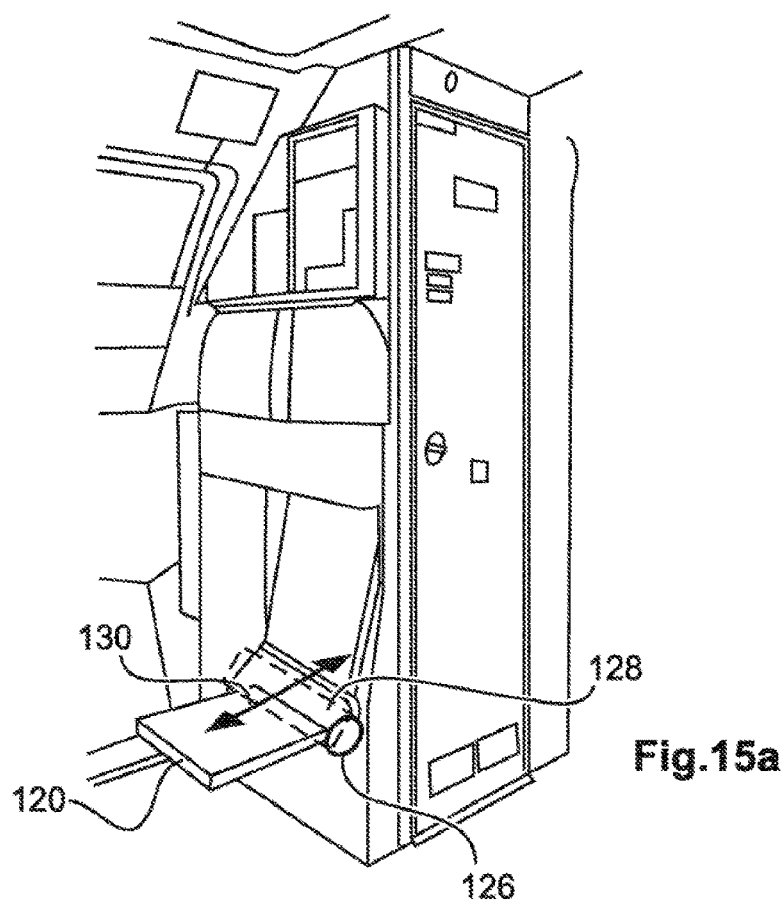
FIG. 15a shows an example of a cabin attendant seat and transition seating support as a bi-functional seating support in a perspective view.
Figure 15B:
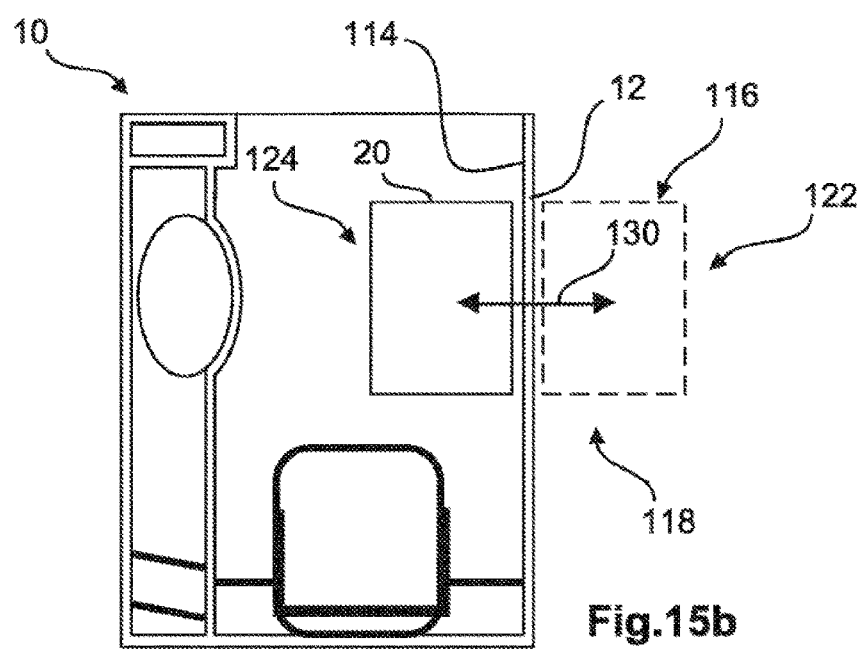
FIG. 15b shows the bi-functional seating support of FIG. 15a in a plan view.

FIG. 15 shows a perspective view in FIG. 15A and a plan view in FIG. 15B, indicating a seating element 120 that is slideable between a first position 122 and a second position 124. In the first position 122, the seating element is arranged outside the lavatory housing, i.e. the lavatory unit 10, the seating element acting as the cabin attendant seat 116. In the second position 124, the seating element 120 is arranged inside the lavatory housing structure 12, the seating element acting as the transition seating support 20. The lavatory housing structure 12 is provided with guiding means 126 (not further shown in detail) and a slot opening 128. The horizontal sliding movement to change between the two functions is indicated with a double arrow 130.

Figure 16A:
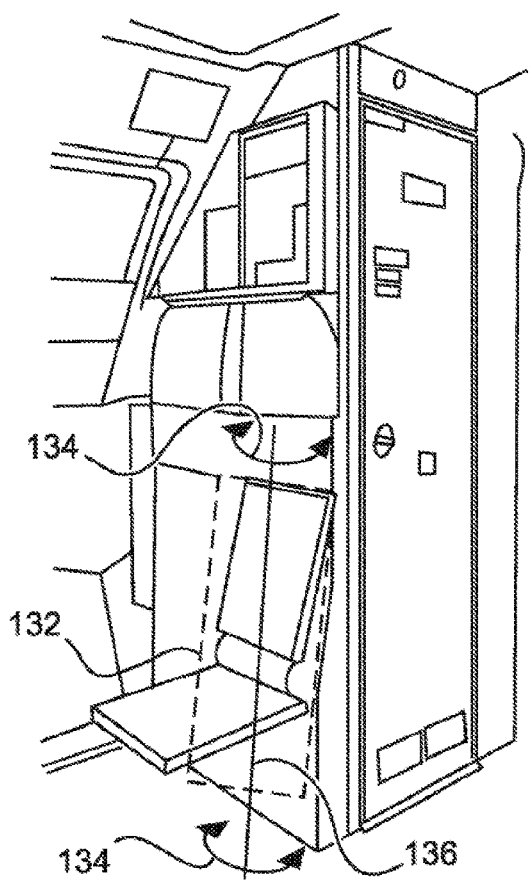
FIG. 16a shows a further example of a bi-functional seating support with a vertical rotating axis in a perspective view.
Figure 16B:
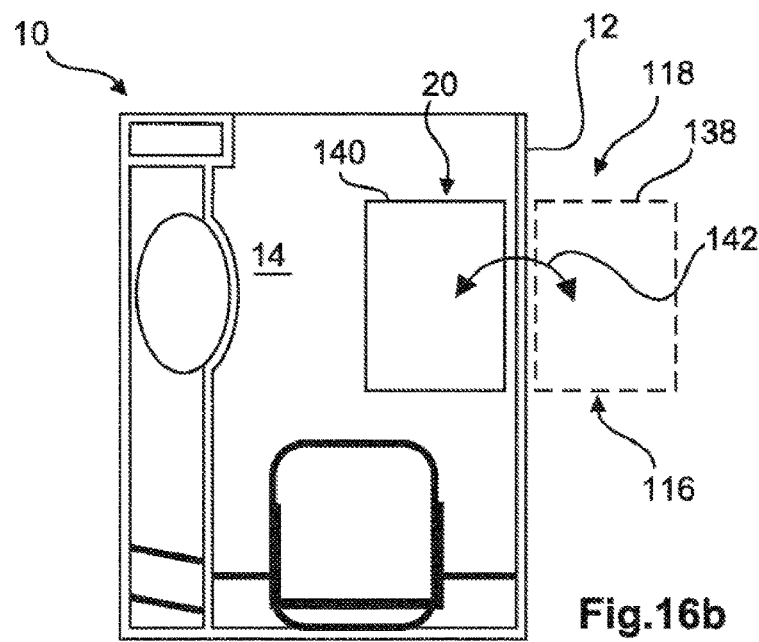
FIG. 16b shows the bi-functional seating support of FIG. 16a in a plan view.

FIG. 16 shows another example of the bi-functional seating support 118 in a perspective view in FIG. 16A and in a plan view in FIG. 16B. A cut-out 132 and rotating support means, indicated with two double arrows 134, for a seat are provided in the lavatory housing structure 12. The seat is mounted rotatably around a vertical axis 136 between a first rotation position 138 and a second rotation position 140. In the first rotating position 138, the seat is facing to a cabin space, i.e. outside the lavatory unit 10, the seat acting as the cabin attendant seat 116. In the second rotating position 140, the seat is facing the lavatory interior space 14, the seat acting as the transition seating support 20. A further double arrow 142 indicates the change between the two positions by the rotation around the vertical axis 136.

Figure 17A:
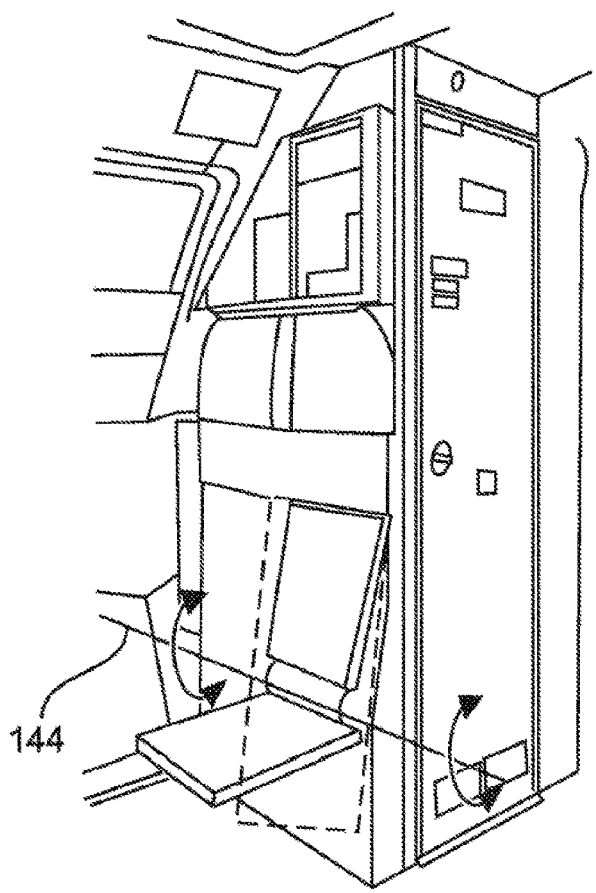
FIG. 17a shows a further example of a bi-functional seating support with a horizontal pivoting axis, in a perspective view.
Figure 17B:
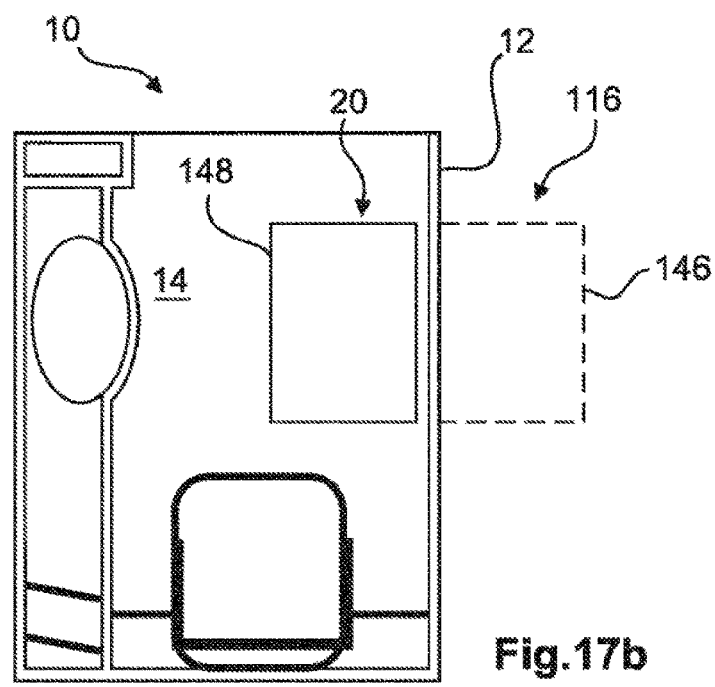
FIG. 17b shows the bi-functional support of FIG. 17a in a plan view.

A further example of the bi-functional seating support 118 is shown in FIG. 17A in a perspective view, and in FIG. 17A in a plan view. The seat is mounted rotatably around a horizontal axis 144 between a first rotation position 146 and a second rotation position 148. In the first rotation position 146, the seat is facing to the cabin space, i.e. outside the lavatory unit 10, the seat acting as the cabin attendant seat 116. In the second rotation position 148, the seat is facing the lavatory interior space 14, the seat acting as the transition seating support 20.

Figure 18:
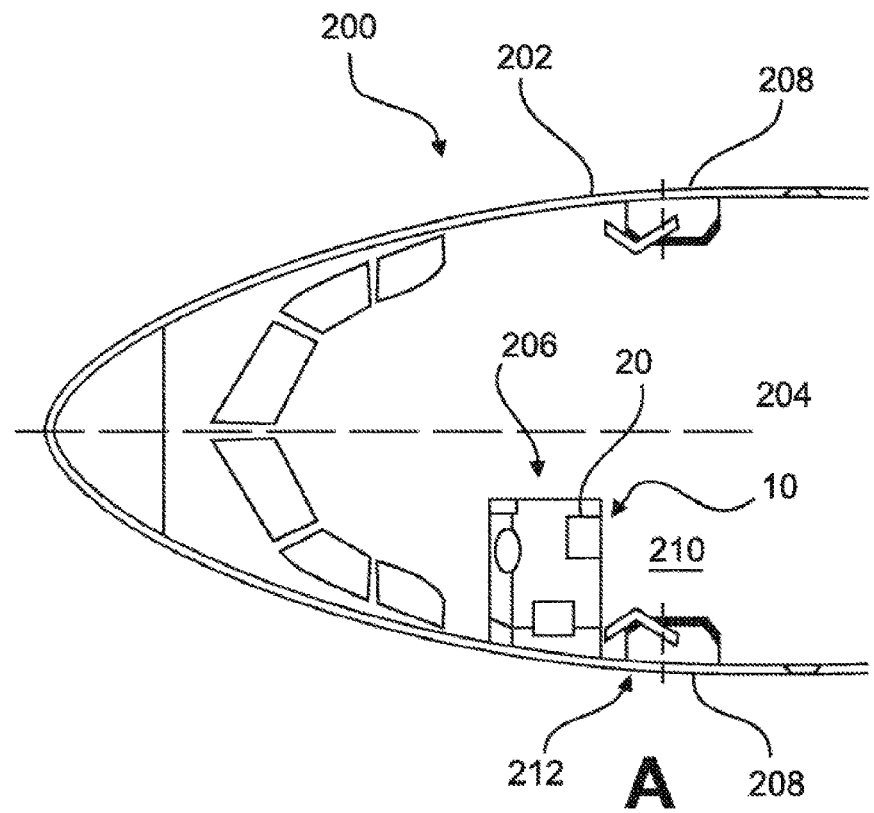
FIG. 18 shows an example of an aircraft in a plan view (section shown only) with a lavatory unit.

FIG. 18 shows an aircraft 200 (only the front section is shown schematically) with a fuselage structure 202, enclosing a cabin space 204, and at least one lavatory unit 206. At least one lavatory unit is provided as the lavatory unit 10, according to one of the above-mentioned examples. The aircraft 200 may be provided with door openings 2008 in the fuselage structure 202. The cabin 204 may comprise a door exit/entry area 210 adjacent to the door 208, and a lavatory unit 10 next to the exit/entry area is provided according to one of the above-described examples. For example, the lavatory unit 10 is arranged next to a forward door on a portside of the aircraft, which door is indicated with reference numeral 212. The forward door in the portside of the aircraft 200 is also referred to as door A, as indicated.

Figure 19:
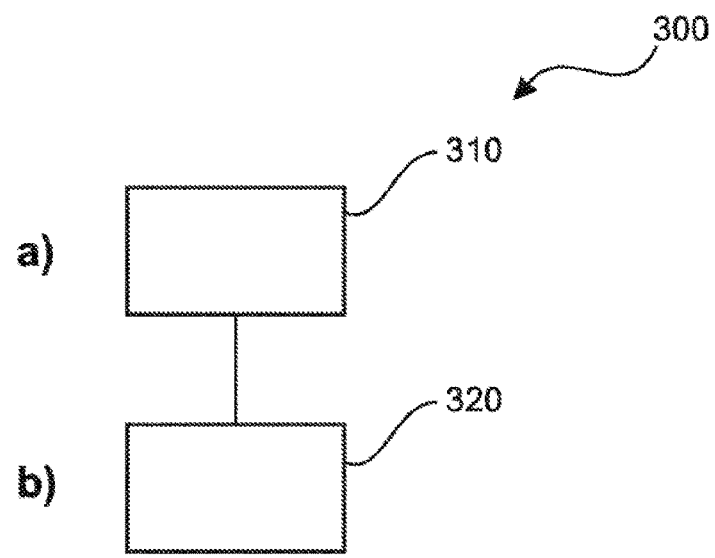
FIG. 19 shows an example of a method for providing a handicapped-accessible lavatory unit on-board a vehicle.

FIG. 19 shows a method 300 for providing a handicapped-accessible lavatory unit 10 on-board a vehicle. The following steps are provided: In a first provision step 310, a lavatory housing structure enclosing a lavatory interior space with a toilet assembly inside, and a door opening in the lavatory housing structure is provided. In a second provision step 320, a transition seating support for a user is provided. In an open door state, a person sitting in a wheelchair that is located outside the lavatory unit can directly access the transition seating support arranged in the first transfer position and can transfer from the wheelchair to the transition seating support and vice versa. The person sitting on the transition seating support arranged in the second transfer position can transfer to the toilet assembly and vice versa. The first provision step 310 is also referred to as step a), and the second provision step 320 as step b).

According to further examples, not shown in detail, the method also comprises providing a lavatory housing structure and a transition seating support with the above-mentioned features and characteristics.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lavatory unit for use by persons with reduced mobility on-board a vehicle, the lavatory unit comprising:
a lavatory housing structure enclosing a lavatory interior space;
a door opening in the lavatory housing structure;
a toilet assembly inside the lavatory interior space; and
a transition seating support for a user;
wherein the transition seating support is configured to provide a first transfer position and a second transfer position,
wherein in the first transfer position, in an open door state the transition seating support is directly accessible for a person sitting in a wheelchair located at least partly outside the lavatory unit such that the person can transfer to the transition seating support and vice versa,
wherein in the second transfer position, a person sitting on the transition seating support can transfer to the toilet assembly and vice versa,
wherein the transition seating support is temporarily arrangeable in a moving area of the toilet assembly, and wherein upon transition to the toilet assembly, the transition seating support is removable outside the moving area of the toilet assembly, and
wherein the transition seating support is a movable seat translatable in a horizontal direction between a position closer to the wheelchair and a position closer to the toilet assembly.

2. The lavatory unit according to claim 1, wherein in the second transition position, the transition seating support is provided in close vicinity to a sitting support of the toilet assembly such that during a transition, a person is permanently supported in a tilt-free manner.

3. The lavatory unit according to claim 2, wherein in the second transition position, a distance $D_1$ of less than approximately 15 cm between the transition seating support and a sitting support of the toilet assembly is provided.

4. The lavatory unit according to claim 1, further comprising a knee abutment and guiding arrangement opposite the transition seating support,
  wherein the knee abutment and guiding arrangement comprises a concave knee abutment recess.

5. The lavatory unit according to claim 4, wherein the concave abutment includes a concave shape in a horizontal direction and a concave shape in a vertical direction.

6. The lavatory unit according to claim 4, wherein the concave abutment recess provides a point of rotation for front tips of a knee of a person transferring from a wheelchair located outside the lavatory unit via the transition seating support to the toilet assembly.

7. The lavatory unit according to claim 1, wherein the transition seating support is at least arrangeable in the first transfer position and the second transfer position.

8. The lavatory unit according to claim 1, wherein in the first transfer position, the transition seating support is arranged inside the lavatory interior space between the toilet assembly and the door opening, wherein the transition seating support is extending at least partly into the door opening; and
  wherein the transition seating support is accessible for a person sitting in a wheelchair that is located in front of the door opening.

9. The lavatory unit according to claim 1, wherein in the first transfer position, the transition seating support is arranged at least partly outside the lavatory interior space, and
  wherein the transition seating support is movable at least between the first transfer position and the second transfer position.

10. The lavatory unit according to claim 1, wherein the transition seating support is movable at least partly underneath a seating support of an on-board wheelchair for facilitating a transfer from the wheelchair to the transition seating support.

11. The lavatory unit according to claim 1, wherein the transition seating support is movable at least partly over the toilet assembly.

12. The lavatory unit according to claim 1, wherein a transition seat extension is provided at least temporarily between the transition seating support and a toilet seat of the toilet assembly.

13. The lavatory unit according to claim 1, wherein the transition seating support comprises a sitting surface comprising two upper-leg resting segments extending from a bottom resting segment, and
  wherein a cut-out is provided between the two upper-leg resting segments for leg positioning of an assisting person.

14. The lavatory unit according to claim 1, wherein the transition seating support is attached to an inner side of a portion of the lavatory housing structure, on which outer side a further cabin seat is provided; and
  wherein the further cabin seat and the transition seating support are provided by a bi-functional seating support.

15. An aircraft, comprising:
  a fuselage structure enclosing a cabin space; and
  at least one lavatory unit according to claim 1.

16. A method for providing a handicapped accessible lavatory unit on-board a vehicle, comprising:
  a) providing a lavatory housing structure enclosing a lavatory interior space with a toilet assembly inside, and a door opening in the lavatory housing structure; and
  b) providing a transition seating support for a user,
  wherein, in an open door state, a person sitting in a wheelchair located at least partly outside the lavatory unit can directly access the transition seating support providing a first transfer position and can transfer from the wheelchair to the transition seating support and ice versa; and
  wherein the person sitting on the transition seating support providing a second transfer position can transfer to the toilet assembly and vice versa,
  wherein the transition seating support is temporarily arrangeable in a moving area of the toilet assembly; and
  wherein upon transition to the toilet assembly, the transition seating support is removable outside the moving area of the toilet assembly, and
  wherein the transition seating support is a movable seat translatable in a horizontal direction between a position closer to the wheelchair and a position closer to the toilet assembly.

17. A lavatory unit for use by persons with reduced mobility on-board a vehicle, the lavatory unit comprising:
  a lavatory housing structure enclosing a lavatory interior space;
  a door opening in the lavatory housing structure;
  a toilet assembly inside the lavatory interior space; and
  a transition seating support for a user;
  wherein the transition seating support is configured to provide a first transfer position and a second transfer position;
  wherein in the first transfer position, in an open door state the transition seating support is directly accessible for a person sitting in a wheelchair located at least partly outside the lavatory unit such that the person can transfer to the transition seating support and vice versa;
  wherein in the second transfer position, a person sitting on the transition seating support can transfer to the toilet assembly and vice versa; and
  further comprising a knee abutment and guiding arrangement opposite the transition seating support; wherein the knee abutment and guiding arrangement comprises a concave knee abutment recess.

18. The lavatory unit according to claim 16, wherein the concave abutment includes a concave shape in a horizontal direction and a concave shape in a vertical direction.

19. The lavatory unit according to claim 16, wherein the concave abutment recess provides a point of rotation for front tips of a knee of a person transferring from a wheelchair located outside the lavatory unit via the transition seating support to the toilet assembly.

* * * * *